(12) United States Patent
Drennen

(10) Patent No.: US 6,390,247 B1
(45) Date of Patent: May 21, 2002

(54) ELECTRIC CALIPER WITH ECCENTRIC LEVER DRIVE

(75) Inventor: David Bernard Drennen, Bellbrook, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/686,586

(22) Filed: Oct. 11, 2000

Related U.S. Application Data

(60) Provisional application No. 60/167,346, filed on Nov. 24, 1999.

(51) Int. Cl.[7] .......................... F16D 55/08; F16D 55/16
(52) U.S. Cl. .................. 188/72.8; 188/106 P; 188/71.9
(58) Field of Search .............................. 188/72.6, 72.7, 188/72.8, 162, 106 P, 71.7, 71.8, 71.9

(56) References Cited

U.S. PATENT DOCUMENTS

| | | | | |
|---|---|---|---|---|
| 2,933,159 A | * | 4/1960 | Steinbinger | 188/106 P |
| 3,638,763 A | * | 2/1972 | Laverdant | 188/72.6 |
| 3,802,539 A | * | 4/1974 | Thiele | 188/72.9 |
| 3,724,605 A | * | 4/1975 | Naismith et al. | 188/71.8 |
| 4,202,430 A | * | 5/1980 | Stevens | 188/162 |
| 4,544,045 A | * | 10/1985 | Runkle | 188/72.6 |
| 4,635,761 A | * | 1/1987 | Smith et al. | 188/72.6 |
| 5,020,643 A | * | 6/1991 | Redenbarger | 188/72.8 |
| 5,348,123 A | * | 9/1994 | Takahashi et al. | 188/72.8 |
| 4,966,256 A | * | 10/1996 | Hunt | 188/72.7 |

FOREIGN PATENT DOCUMENTS

| | | | | |
|---|---|---|---|---|
| FR | 535036 | * | 6/1923 | 188/162 |
| IT | 329659 | * | 9/1935 | 188/162 |

* cited by examiner

*Primary Examiner*—Paul N. Dickson
*Assistant Examiner*—Robert A. Siconolfi
(74) *Attorney, Agent, or Firm*—Roger M. Sigler

(57) ABSTRACT

A brake caliper. A motor rotates a ball screw which translates a ball nut and a first drive pin. Translation of the first drive pin rotates a first brake lever attached to an eccentric cam shaft having a cam portion. Rotation of the cam portion on the eccentric cam shaft translates a piston shaft assembly, a piston head attached to the piston shaft assembly, and a first brake pad attached to the piston head. The first brake lever is attachable to, and rotatable by, a manually-actuated parking brake cable. This allows operation of the parking brake to stop the vehicle in an emergency should the motor fail to operate from whatever cause including loss of power.

8 Claims, 2 Drawing Sheets

ELECTRIC CALIPER WITH ECCENTRIC LEVER DRIVE

CROSS-REFERENCE TO RELATED APPLICATIONS

The present application claims priority from U.S. Provisional Application No. 60/167,346 filed Nov. 24, 1999, the entire disclosure of which is incorporated herein by reference.

TECHNICAL FIELD

The present invention relates generally to brake calipers, and more particularly to an electric brake caliper that allows manually-actuated parking brake application.

BACKGROUND OF THE INVENTION

Conventional electric brake calipers utilize an electric motor which drives a gear assembly positioned within the caliper housing to force an inner brake pad, carried on a piston, against a brake rotor of a vehicle. An outer brake pad, mounted to a caliper housing, is positioned on an opposite side of the brake rotor. Therefore, during braking, the inner brake pad will be forced against the rotor and a resulting reactionary force will pull the outer brake pad into engagement with the opposite side of the rotor. Engagement of the inner and outer brake pads with the rotor will slow and stop the vehicle or hold a stopped vehicle in a fixed position.

A load sensor positioned to detect the amount of force applied by the inner brake pad to the rotor is operatively coupled to a mechanism for controlling the position of the caliper housing and, in turn, the force applied by the outer brake pad. Accordingly, this mechanism is used to equalize (or centralize) the force applied by the two brake pads on the rotor. An example of such a conventional electric caliber mechanism can be found in U.S. Pat. No. 4,804,073.

One disadvantage with such conventional electric brake calipers is that the electric motor operating the electric brake caliper must be actuated for the parking brake to be applied. Accordingly, if the vehicle encounters a complete loss of power, even the parking brake would not be able to be applied.

SUMMARY OF THE INVENTION

In a first expression of an embodiment of the invention, a brake caliper includes a motor, a ball screw rotatably driven by the motor, and a ball nut threadably engaged on the ball screw. The brake caliper also includes a first drive pin translatable by the ball nut, a first brake lever, and an eccentric cam shaft having a cam portion and connected to the first brake lever wherein the first brake lever and the eccentric cam shaft are rotatable by translation of the first drive pin. The brake caliper further includes a piston shaft assembly translatable by the cam portion and a piston head attached to the piston shaft assembly. The brake caliper additionally includes a brake-caliper housing having a rotor channel for receiving a rotor therein. The rotor has a first surface for engagement with a first brake pad, and the first brake pad is translatable by the piston head. In operation, the motor rotates the ball screw which translates the ball nut and the first drive pin which rotates the first brake lever, the eccentric cam shaft, and the cam portion which translates the piston shaft assembly, the piston head, and the first brake pad. In one design, the first brake lever is attachable to, and rotatable by, a manually-actuated parking brake cable. This allows operation of the parking brake to stop the vehicle in an emergency should the motor fail to operate from whatever cause including loss of power.

In a second expression of an embodiment of the invention, a brake caliper includes an electric motor, a ball screw rotatably driven by the electric motor, a ball nut threadably engaged on the ball screw, and a ball-nut housing attached to the ball nut. The brake caliper also includes a first drive pin, a first brake lever, and an eccentric cam shaft. The first drive pin is attached to the ball-nut housing and extends generally perpendicular to the ball screw. The first brake lever has an axis of rotation generally parallel to the first drive pin and includes a first groove wherein the first drive pin extends into the first groove. The eccentric cam shaft has a cam portion, is connected to the first brake lever, and has an axis of rotation generally coincident with the axis of rotation of the first brake lever. The brake caliper further includes a piston shaft assembly and a piston head attached to the piston shaft assembly. The piston shaft assembly includes an end slot and has a longitudinal axis generally perpendicular to the axis of rotation of the eccentric cam shaft wherein the cam portion is seated in the end slot. The brake caliper additionally includes a brake-caliper housing having a rotor channel for receiving a rotor therein. The rotor has a first surface for engagement with a first brake pad, and the first brake pad is attachable to the piston head. In operation, the electric motor rotates the ball screw which translates the ball nut, the ball-nut housing, and the first drive pin which rotates the first brake lever, the eccentric cam shaft, and the cam portion which translates the piston shaft assembly, the piston head, and the first brake pad. In one design, the first brake lever is attachable to, and rotatable by, a manually-actuated parking brake cable. This allows operation of the parking brake to stop the vehicle in an emergency should the electric motor fail to operate from whatever cause including loss of electric power.

In a third expression of an embodiment of the invention, a brake caliper includes a brake-caliper housing, a piston shaft assembly, a first brake pad, and an eccentric cam shaft. The brake-caliper housing includes a rotor channel for receiving a rotor therein. The piston shaft assembly is mounted in the brake-caliper housing for reciprocation into and out of the rotor channel. The first brake pad is attached to the piston shaft assembly. The eccentric cam shaft is positioned in the brake-caliper housing and has a cam portion operatively coupled to the piston shaft assembly, wherein rotation of the eccentric cam shaft in a first direction causes the piston shaft assembly to move towards the rotor channel, and wherein rotation of the eccentric cam shaft in a second direction causes the piston shaft assembly to move away from the rotor channel.

A first method of the invention is for actuating a piston shaft assembly in a brake caliper, wherein the brake caliper has a brake-caliper housing including a rotor channel for receiving a rotor therein, and wherein the piston shaft assembly is mounted in the brake-caliper housing for reciprocation into and out of the rotor channel. The method includes several steps. One step is obtaining an eccentric cam shaft having a cam portion. Then, the eccentric cam shaft is positioned in the brake-caliper housing. Next, the cam portion is operatively coupled to the piston shaft assembly so that rotation of the eccentric cam shaft in a first direction causes the piston shaft assembly to move towards the rotor channel and rotation of the eccentric cam shaft in a second direction causes the piston shaft assembly to move away from the rotor channel.

A second method of the invention is for adjusting the length of a piston shaft assembly in a brake caliper, wherein the brake caliper has a brake-caliper housing including a rotor channel for receiving a rotor therein, and wherein the piston shaft assembly is mounted in the brake-caliper housing for reciprocation into and out of the rotor channel. The method includes several steps. One step is obtaining an eccentric cam shaft having a cam portion. Then, the eccentric cam shaft is positioned in the brake-caliper housing. Another step is providing the piston shaft assembly with an adjustment screw for extending the length of the piston shaft assembly. Then, a one-way clutch assembly is operatively coupled to the adjustment screw, wherein the one-way clutch assembly is rotatable by an adjustment lever connected to the eccentric cam shaft. Finally, the adjustment lever is rotated.

DESCRIPTION OF THE PREFERRED EMBODIMENT

Figure 1:
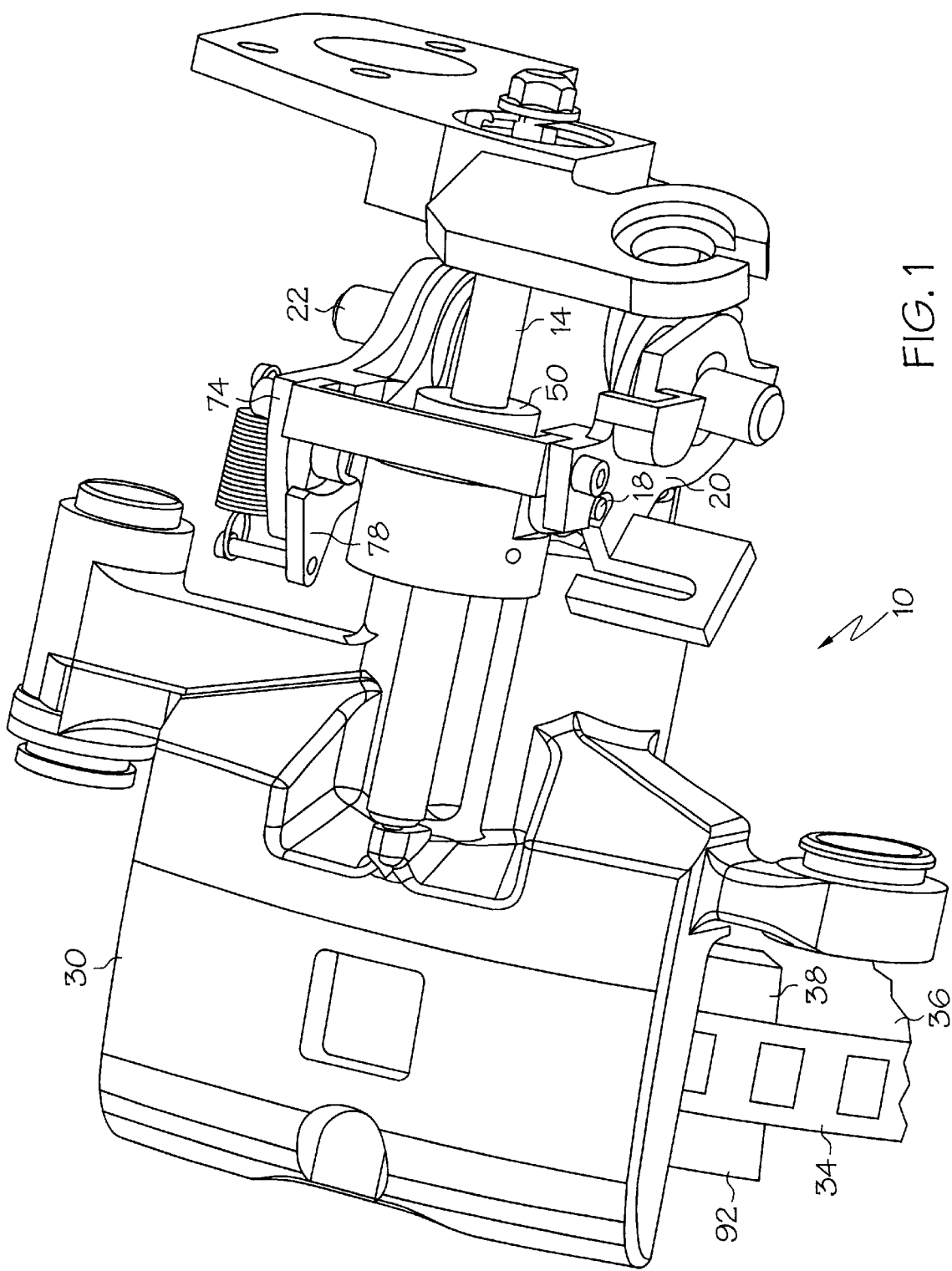
FIG. 1 is a schematic perspective view of a preferred embodiment of the brake caliper of the invention together with a rotor and first (inner) and second (outer) brake pads.
Figure 2:
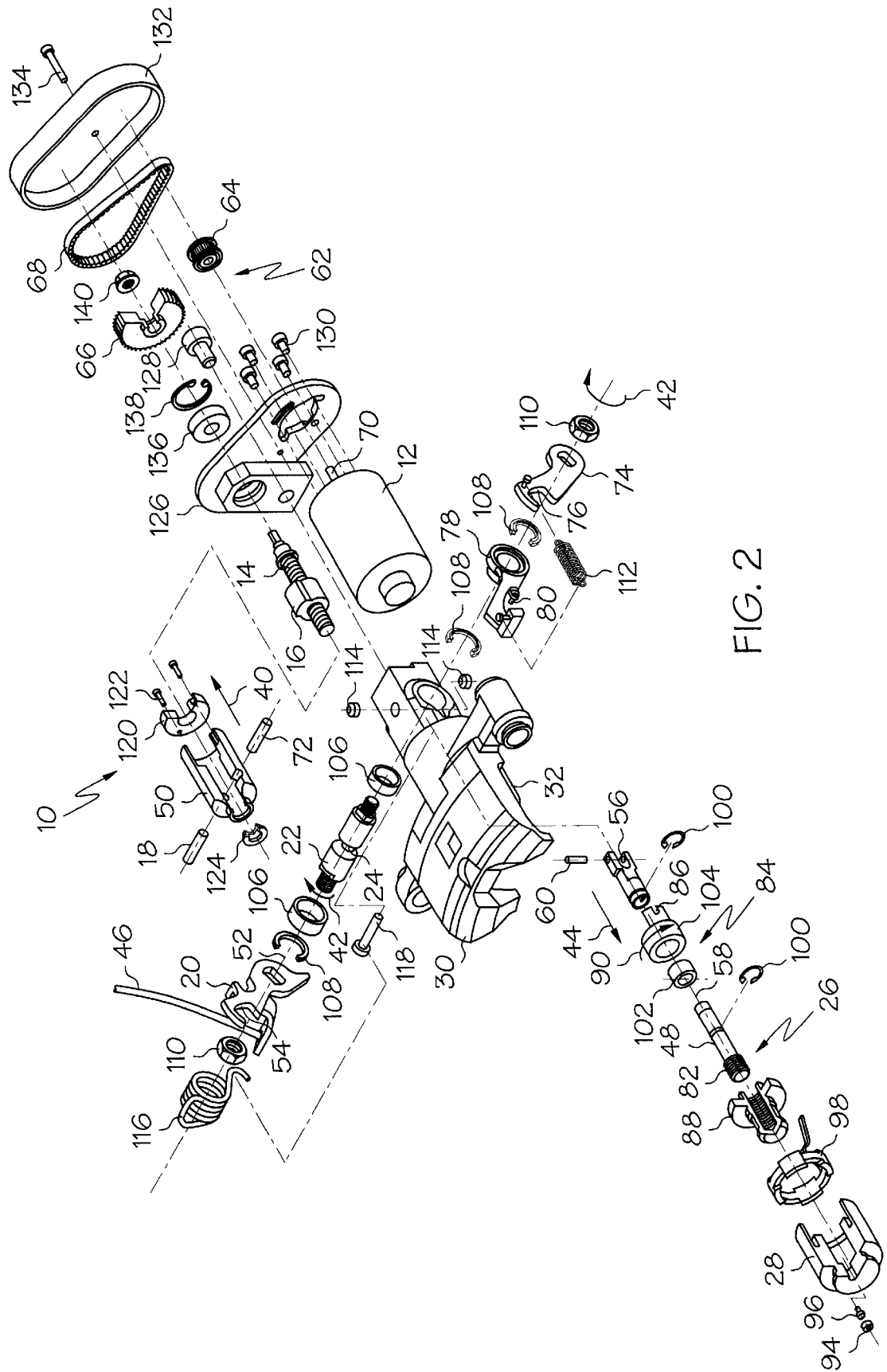
FIG. 2 is a mirror-imaged exploded view of the brake caliper of FIG. 1 together with a manually-actuated parking brake cable.

Referring now to the drawings, wherein like numerals represent like elements throughout, FIGS. 1 and 2 show a preferred embodiment of the brake caliper 10 of the present invention. In a first expression of the preferred embodiment of the invention shown in FIGS. 1 and 2, the brake caliper 10 includes a motor (preferably an electric motor 12), a ball screw 14 rotatably driven by the motor (e.g., electric motor 12), and a ball nut 16 threadably engaged on the ball screw 14. The brake caliper 10 also includes a first drive pin 18 axially translatable by the ball nut 16, a first brake lever 20 engaged with the drive pin 18, and an eccentric cam shaft 22 having a cam portion 24 and connected to the first brake lever 20 wherein the first brake lever 20 and the eccentric cam shaft 22 are rotatable (in the rotational direction indicated by arrow 42) by translation of the first drive pin 18 (in the axial direction indicated by arrow 40). The brake caliper 10 further includes a piston shaft assembly 26 translatable by the cam portion 24 and also includes a piston head 28 attached to the piston shaft assembly 26. For purposes of describing the invention, an eccentric cam shaft 22 having a cam portion 24 is equivalent to a concentric shaft having an attached cam.

The brake caliper 10 additionally includes a brake-caliper housing 30 having a rotor channel 32 for receiving a rotor 34 therein. The rotor 34 has a first surface 36 for engagement with a first brake pad 38, and the first brake pad 38 is translatable by the piston head 28. In operation, the motor (e.g., electric motor 12) rotates the ball screw 14 which translates the ball nut 16 and the first drive pin 18 in the direction of arrow 40 which rotates the first brake lever 20, the eccentric cam shaft 22, and the cam portion 24 in the direction of arrow 42, which, in turn, translates the piston shaft assembly 26, the piston head 28, and the first brake pad 38 in the direction of arrow 44 so that the first brake pad 38 is brought into engagement with the first surface 36 of the rotor 34. When the direction of rotation of the motor (e.g., electric motor 12) is reversed, the first brake pad 38 withdraws from the first surface 36 of the rotor 34, as is readily understood by the artisan.

Preferably, the first brake lever 20 is attachable to, and rotatable by, a manually-actuated parking brake cable 46 (also known as an emergency brake cable). This allows operation of the parking brake (also known as the emergency brake) to stop the vehicle in an emergency should the motor (e.g., electric motor 12) fail to operate from whatever cause including loss of power. For purposes of describing the invention, the terminology "manually-actuated" means that a person, instead of a motor, supplies the force (such as by stepping on a parking brake lever in a passenger compartment of a vehicle) to operate the parking brake cable 46. As can be appreciated from FIG. 2, tension on the parking brake cable 46 will rotate the first brake lever 20 in the direction of arrow 42 despite the first drive pin 18, the ball nut 16, the ball screw 14, and the motor (e.g., electric motor 12) being completely immobilized. Rotation of the first brake lever 20 in the direction of arrow 42 will rotate the eccentric cam shaft 22 and the cam portion 24 in the direction of arrow 42 which translates the piston shaft assembly 26, the piston head 28, and the first brake pad 38 in the direction of arrow 44 so that the first brake pad 38 is brought into engagement with the first surface 36 of the rotor 34.

Preferably, the piston shaft assembly 26 includes an adjustment screw 48 for extending the length of the piston shaft assembly 26. Extending the length of the piston shaft assembly 26 will bring the first brake pad 38 closer to the first surface 36 of the rotor 34 when the first brake pad 38 is in its withdrawn state (i.e., when the first brake pad 38 is withdrawn from the first surface 36 of the rotor 34). This adjustment screw 48 may be used to compensate for wear on the first brake pad 38, as can be appreciated by the artisan.

In a second expression of the preferred embodiment of the invention shown in FIGS. 1 and 2, the brake caliper 10 includes an electric motor 12, a ball screw 14 rotatably driven by the electric motor 12, a ball nut 16 threadably engaged on the ball screw 14, and a ball-nut housing 50 attached to the ball nut 16. The brake caliper 10 also includes a first drive pin 18, a first brake lever 20, and an eccentric cam shaft 22 having a cam portion 24. The first drive pin 18 is attached to the ball-nut housing 50 and extends generally perpendicular to the ball screw 14. The first brake lever 20 has an axis of rotation 52 disposed generally parallel to the first drive pin 18 and includes a first groove 54 wherein the first drive pin 18 extends into the first groove 54. The eccentric cam shaft 22 is connected to the first brake lever 20 and has an axis of rotation disposed generally coincident with the axis of rotation 52 of the first brake lever 20. The brake caliper 10 further includes a piston shaft assembly 26 and a piston head 28 attached to the piston shaft assembly 26.

For purposes of describing the invention, an eccentric cam shaft 22 having a cam portion 24 is equivalent to a concentric shaft with an attached cam. Also, for purposes of describing the invention, the term "generally" when used before terms such as perpendicular, coincident, or parallel is to be interpreted, in the broadest sense, that the cited elements are close enough to perpendicular, coincident, or parallel for the brake caliper 10 to operate as described and is to be interpreted, in the narrowest sense, that the cited elements are designed to be perpendicular, coincident, or parallel and are manufactured or assembled as such to within manufacturing or assembly tolerances.

The piston shaft assembly 26 includes an end slot 56 and has a longitudinal axis 58 disposed generally perpendicular to the axis of rotation of the eccentric cam shaft 22 wherein the cam portion 24 is seated in the end slot 56 (such as by using a seating pin 60).

The brake caliper 10 additionally includes a brake-caliper housing 30 having a rotor channel 32 for receiving a rotor 34 therein. The rotor 34 has a first surface 36 for engagement with a first brake pad 38, and the first brake pad 38 is attachable to the piston head 28.

In operation, the electric motor 12 rotates the ball screw 14 which translates the ball nut 16, the ball-nut housing 50, and the first drive pin 18 in the direction of arrow 40 which rotates the first brake lever 20, the eccentric cam shaft 22, and the cam portion 24 in the direction of arrow 42 which translates the piston shaft assembly 26, the piston head 28, and the first brake pad 38 in the direction of arrow 44 so that the first brake pad 38 is brought into engagement with the first surface 36 of the rotor 34. When the direction of rotation of the electric motor 12 is reversed, the first brake pad 38 withdraws from the first surface 36 of the rotor 34, as is readably understood by the artisan.

Preferably, the first brake lever 20 is attachable to, and rotatable by, a manually-actuated parking brake cable 46 (also known as an emergency brake cable). This allows operation of the parking brake (also known as the emergency brake) to stop the vehicle in an emergency should the electric motor 12 fail to operate from whatever cause including loss of power. For purposes of describing the invention, the terminology "manually-actuated" means that a person, instead of a motor, supplies the force (such as by stepping on a parking brake lever in a passenger compartment of a vehicle) to operate the parking brake cable 46. As can be appreciated from FIG. 2, tension on the parking brake cable 46 will rotate the first brake lever 20 in the direction of arrow 42 despite the first drive pin 18, the ball-nut housing 50, the ball nut 16, the ball screw 14, and the electric motor 12 being completely immobilized. Rotation of the first brake lever 20 in the direction of arrow 42 will rotate the eccentric cam shaft 22 and the cam portion 24 in the direction of arrow 42 which translates the piston shaft assembly 26, the piston head 28, and the first brake pad 38 in the direction of arrow 44 so that the first brake pad 38 is brought into engagement with the first surface 36 of the rotor 34.

Preferably, the brake caliper 10 also includes a pulley assembly 62 having toothed first and second pulleys 64 and 66 and a pulley timing belt 68. The pulley timing belt 68 surrounds, and is in partial-circumferential compressive contact with, the first and second pulleys 64 and 66. The electric motor 12 has a motor shaft 70, the first pulley 64 is attached to the motor shaft 70, and the second pulley 66 is attached to the ball screw 14. In the preferred embodiment, the pulley assembly 62 has a mechanical advantage of generally three, the ball screw 14 has a mechanical advantage of generally eight, and the first brake lever 20 has a mechanical advantage of generally sixteen providing the brake caliper 10 with generally four-hundred times the force provided by the torque from the electric motor 12. For purposes of describing the invention, the term "generally" when used before numbers such as three, eight, sixteen, or four hundred means the number plus or minus ten percent.

Preferably, the brake caliper 10 also includes a second drive pin 72 engaged with a second brake lever 74. The second drive pin 72 is attached to the ball-nut housing 50 and extends generally opposite to the first drive pin 18. For purposes of describing the invention, the terminology "generally opposite" means that the first and second drive pins 18 and 72 are generally coincident and extend in opposite directions from the ball-nut housing 50. The second brake lever 74 has an axis of rotation disposed generally parallel to the second drive pin 72 and includes a second groove 76, wherein the second drive pin 72 extends into the second groove 76. The eccentric cam shaft 22 is connected to the second brake lever 74, the axis of rotation of the eccentric cam shaft 22 is disposed generally coincident with the axis of rotation of the second brake lever 74, and the cam portion 24 is disposed between the first and second brake levers 20 and 74. The presence of the second drive pin 72 and the second brake lever 74 provide for uniform load application, as can be appreciated by the artisan.

Preferably, the piston shaft assembly 26 includes an adjustment screw 48 for extending the length of the piston shaft assembly 26. Extending the length of the piston shaft assembly 26 will bring the first brake pad 38 closer to the first surface 36 of the rotor 34 when the first brake pad 38 is in its withdrawn state (i.e., when the first brake pad 38 is withdrawn from the first surface 36 of the rotor 34). This compensates for wear on the first brake pad 38, as can be appreciated by the artisan. The brake caliper 10 also preferably includes an adjustment lever 78 having an axis of rotation disposed generally coincident with the axes of rotation of the first and second brake levers 20 and 74. The adjustment lever 78 is disposed between the cam portion 24 and one of the first and second brake levers 20 and 74. The eccentric cam shaft 22 is connected to the adjustment lever 78, and the adjustment screw 48 of the piston shaft assembly 26 is rotatable by rotation of the adjustment lever 78. The adjustment lever 78 includes an adjustment pin 80 disposed off-center from, and extending generally parallel to, the axis of rotation of the adjustment lever 78. The adjustment screw 48 has a threaded end 82, and the piston shaft assembly 26 includes a one-way clutch assembly 84 (also known as a roller-clutch assembly) engagable with the adjustment screw 48 and disposed longitudinally between the end slot 56 and the threaded end 82 of the adjustment screw 48. The one-way clutch assembly 84 includes an adjustment groove 86, and the adjustment pin 80 extends into the adjustment groove 86. The piston shaft assembly 26 includes a piston core nut 88 threaded on the threaded end 82 of the adjustment screw 48, and the piston head 28 is attached to the piston core nut 88.

In operation, when the piston head 28 needs to be adjusted so that it resides closer to the first surface 36 of the rotor 34 to account for wear in the first brake pad 38, the adjustment lever 78 is rotated in a direction opposite to arrow 42. Such rotation of adjustment lever 78 turns the one-way clutch assembly 84 in the direction of arrow 90 which causes the one-way clutch assembly 84 to engage the adjustment screw 48 and rotate the adjustment screw 48 in the direction of arrow 90. Rotation of the adjustment screw 48 in the direction of arrow 90 translates the piston core nut 88 in the direction of arrow 44 extending the length of the piston shaft assembly 26 bringing the piston head 28 closer to the first surface 36 of the rotor 34. It is noted that, in this design, the cam portion 24 typically moves the piston shaft assembly 26 only generally 0.140 inch so such periodic adjustment is required to account for wear of the first brake pad 38. It is further noted that, in this design, rotation of the one-way clutch assembly 84 in a direction opposite to arrow 90 will disengage the one-way clutch assembly 84 from the adjustment screw 48 so that adjustment of the piston head 28 will not be affected. In the preferred embodiment, the adjustment lever 78 is actuated by reversing the direction of rotation of the electric motor 12 at a time when the brakes are not applied, to cause the adjustment lever 78 to rotate in a direction opposite to arrow 42, after a predetermined number of applications of the brake, wherein the counting function and the reverse actuation of the electric motor 12 are carried out by the motor's computer chip (not shown).

The brake caliper of the invention provides a braking system which allows motor actuation during normal brake operation of a vehicle and allows manual operation (i.e., engagement and release) of the parking brake (also called the emergency brake) when the motor is unavailable to actuate the braking system. The brake caliper of the invention accomplishes this result in an overall package size that is smaller than that of conventional brake calipers.

Various other components are shown in FIGS. 1 and 2 whose function is evident to the artisan from their placement in the figures. A second rake pad 92 (also known as the outer brake pad) cooperates with the first brake ad 38 (also known as the inner brake pad) to allow engagement of the brake pads with opposite sides of the rotor 34. A set screw 94 and a cap screw 96 secure the piston head 28 to the piston core nut 88. A load sensor 98 is provided between the piston head 28 and the piston core nut 88. Clips 100 are provided to retain the adjustment screw 48. The one-way clutch assembly 84 has a one-way clutch 102 (also known as a roller clutch) and a clutch extension 104. Bearings 106 support the eccentric cam shaft 22, seals 108 are provided, and nuts 110 secure the first and second brake levers 20 and 74 and the adjustment lever 78 to the threaded ends of the eccentric cam shaft 22. A spring 112 rotationally biases the adjustment lever 78 to the second brake lever 74. End caps 114 secure the seating pin 60. A parking brake spring 116 and spring pin 118 are provided. The ball-nut housing 50 is provided with an end cap 120, cap screws 122, and a ball-screw retaining clip 124. The pulley assembly 62 has a mounting block 126, a bolt 128, bolts 130 for mounting the electric motor 12, a belt cover 132, and bolt 134. A bushing 136 and clip 138 secure the ball screw 14 to the mounting block 126, and a nut 140 secures the second pulley 66 to the ball screw 14.

The foregoing description of a preferred embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A brake caliper comprising:
   a) an electric motor;
   b) a ball screw rotatably driven by said electric motor;
   c) a ball nut threadably engaged on said ball screw;
   d) a ball-nut housing attached to said ball nut;
   e) a first drive pin attached to said ball-nut housing and extending generally perpendicular to said ball screw;
   f) a first brake lever having an axis of rotation disposed generally parallel to said first drive pin and including a first groove, wherein said first drive pin extends into said first groove;
   g) an eccentric cam shaft having a cam portion, connected to said first brake lever, and having an axis of rotation disposed generally coincident with said axis of rotation of said first brake lever;
   h) a piston shaft assembly including an end slot and having a longitudinal axis disposed generally perpendicular to said axis of rotation of said eccentric cam shaft, wherein said cam portion is seated in said end slot, wherein said piston shaft assembly has a length and includes an adjustment screw having a threaded end for extending the length of said piston shaft assembly;
   i) a piston head attached to said piston shaft assembly;
   j) a brake-caliper housing including a rotor channel for receiving a rotor therein, wherein said rotor has a first surface for engagement with a first brake pad, wherein said first brake pad is attachable to said piston head, and wherein said electric motor rotates said ball screw which translates said ball nut, said ball-nut housing, and said first drive pin which rotates said first brake lever, said eccentric cam shaft, and said cam portion which translates said piston shaft assembly, said piston head, and said first brake pad;
   k) a second drive pin attached to said ball-nut housing and extending generally opposite to said first drive pin;
   l) a second brake lever having an axis of rotation disposed generally parallel to said second drive pin and including a second groove, wherein said second drive pin extends into said second groove, wherein said eccentric cam shaft is connected to said second brake lever, wherein said axis of rotation of said eccentric cam shaft is disposed generally coincident with said axis of rotation of said second brake lever, and wherein said cam portion is disposed between said first and second brake levers; and
   m) an adjustment lever having an axis of rotation disposed generally coincident with said axes of rotation of said first and second brake levers, wherein said adjustment lever is disposed between said cam portion and one of said first and second brake levers, wherein said eccentric cam shaft is connected to said adjustment lever, and wherein said adjustment screw of said piston shaft assembly is rotatable by rotation of said adjustment lever.

2. The brake caliper of claim 1, wherein said adjustment lever includes an adjustment pin disposed off-center from, and extending generally parallel to, said axis of rotation of said adjustment lever, wherein said adjustment screw has a threaded end, wherein said piston shaft assembly includes a one-way clutch assembly engageable with said adjustment screw and disposed longitudinally between said end slot and said threaded end of said adjustment screw, wherein said one-way clutch assembly includes an adjustment groove, and wherein said adjustment pin extends into said adjustment groove.

3. The brake caliper of claim 2, wherein said piston shaft assembly includes a piston core nut threaded on said threaded end of said adjustment screw and wherein said piston head is attached to said piston core nut.

4. The brake caliper of claim 3, wherein said first brake lever is attachable to, and rotatable by, a manually-actuated parking brake cable.

5. A brake caliper comprising:
   a) a motor;
   b) a ball screw rotatably driven by said motor;
   c) a ball nut threadably engaged on said ball screw;
   d) a first drive pin translatable by said ball nut;
   e) a first brake lever engaged with the first drive pin;
   f) an eccentric cam shaft having a cam portion and connected to said first brake lever, wherein said first brake lever and said eccentric cam shaft are rotatable by translation of said first drive pin;
   g) a piston shaft assembly translatable by said cam portion, said piston shaft assembly having a length and including an adjustment screw having a threaded end for extending the length of said piston shaft assembly;

h) a piston head attached to said piston shaft assembly;

i) a brake-caliper housing including a rotor channel for receiving a rotor therein, wherein said rotor has a first surface for engagement with a first brake pad, wherein said first brake pad is translatable by said piston head, and wherein said motor rotates said ball screw which translates said ball nut and said first drive pin which rotates said first brake lever, said eccentric cam shaft, and said cam portion which translates said piston shaft assembly, said piston head, and said first brake pad;

k) a second drive pin translatable by said ball nut and extending generally opposite to said first drive pin;

l) a second brake lever having an axis of rotation disposed generally parallel to said second drive pin and engaged with said eccentric camshaft, wherein said axis of rotation of said eccentric cam shaft is disposed generally coincident with said axis of rotation of said second brake lever, and wherein said cam portion is disposed between said first and second brake levers; and m) an adjustment lever having an axis of rotation disposed generally coincident with said axes of rotation of said first and second brake levers, wherein said adjustment lever is disposed between said cam portion and one of said first and second brake levers, wherein said eccentric cam shaft is connected to said adjustment lever, and wherein said adjustment screw of said piston shaft assembly is rotatable by rotation of said adjustment lever.

6. The brake caliper of claim 5, wherein said adjustment lever includes an adjustment pin disposed off-center from, and extending generally parallel to, said axis of rotation of said adjustment lever, wherein said adjustment screw has a threaded end, wherein said piston shaft assembly includes a one-way clutch assembly engagable with said adjustment screw and disposed longitudinally between said adjustment lever and said threaded end of said adjustment screw, wherein said one-way clutch assembly includes an adjustment groove, and wherein said adjustment pin extends into said adjustment groove.

7. The brake caliper of claim 6, wherein said piston shaft assembly includes a piston core nut threaded on said threaded end of said adjustment screw and wherein said piston head is attached to said piston core nut.

8. The brake caliper of claim 5, wherein said first brake lever is attachable to, and rotatable by, a manually-actuated parking brake cable.

* * * * *